United States Patent [19]

Gubitose et al.

[11] 4,222,502
[45] Sep. 16, 1980

[54] METER AND DISPENSING SYSTEM FOR ABRASIVE MATERIALS

[75] Inventors: Nicholas F. Gubitose, Moosic; Malcolm R. Schuler; Harold R. Ronan, Jr., both of Mountaintop, all of Pa.; Richard E. Novak, East Windsor, N.J.

[73] Assignee: RCA Corporation, New York, N.Y.

[21] Appl. No.: 956,662

[22] Filed: Nov. 1, 1978

[51] Int. Cl.³ .............................................. G01F 11/20
[52] U.S. Cl. .................................. 222/240; 198/658; 222/411; 366/186; 366/318
[58] Field of Search ............... 222/239, 240, 241, 242, 222/411, 412, 413, DIG. 1; 198/658, 661, 676; 366/186, 318; 133/3 B, 3 G

[56] References Cited

U.S. PATENT DOCUMENTS

| 1,330,219 | 2/1920 | Rockwell ........................ 198/658 X |
| 1,467,951 | 9/1923 | Rosenberger ................... 222/240 X |
| 2,984,189 | 5/1961 | Jekat . |
| 3,047,034 | 7/1962 | Sassmannshausen et al. . |
| 3,186,602 | 6/1965 | Ricciardi . |
| 3,422,994 | 1/1969 | Alvarez ............................. 222/240 |
| 3,687,575 | 8/1972 | Bauer . |
| 3,796,508 | 3/1974 | Rowley . |
| 3,896,976 | 7/1975 | Ligouzat . |
| 3,921,794 | 11/1975 | Casselbrant . |
| 3,960,503 | 6/1976 | Rice . |
| 3,998,686 | 12/1976 | Meiling et al. . |
| 4,003,115 | 1/1977 | Fisher .............................. 198/658 X |
| 4,019,830 | 4/1977 | Reid . |

OTHER PUBLICATIONS

Tyco Laboratories Inc., Contract Report "Sapphire Ribbon", Contract No. DAAB05-69-0021, pp. 82-85, Jul. 1971.

Primary Examiner—Robert J. Spar
Assistant Examiner—Fred A. Silverberg
Attorney, Agent, or Firm—B. E. Morris; D. S. Cohen; R. Ochis

[57] ABSTRACT

Accurate metering and dispensing of small quantities of abrasive material comprised of particles or powder, or both is accomplished by feed apparatus comprising a rotatable tubular member having a threaded interior surface for transporting the abrasive material through the tubular member in response to rotation of the member about the axis thereof. The discharge portion of the tube is particularly adapted to dispense frequent, small quantities of the material rather than less frequent larger quantities.

8 Claims, 8 Drawing Figures

METER AND DISPENSING SYSTEM FOR ABRASIVE MATERIALS

BACKGROUND OF THE INVENTION

1. Field of the Invention:

The invention relates to the field of material storage and metering systems and more particularly to the field of accurately metering and feeding small quantities of solid materials, especially, although not limited to, abrasive particulate material.

2. Prior Art:

Prior art systems for delivering particulate material include ones employing a discharge auger within an output tube in the lower portion of a storage bin, a type of system which is inadequate for accurately metering some materials. For some of these materials, the problem of accurate metering is overcome by dual auger systems having a feed auger which surrounds the portion of the discharge auger which is within the bin. The feed augers in these systems comprise a helical spiral which feeds excess material to the discharge auger to minimize air pockets and other density variations in the material being delivered. Unfortunately, neither of these types of auger systems are satisfactory for delivering highly abrasive materials because these materials scour the augers and the exit tubes through which the material passes and may even jam the systems. Even if the systems do not jam, the scouring reduces the life of the equipment and adds impurities to the material being fed.

Accurate delivery of pure aluminum oxide ($Al_2O_3$) (which is abrasive) is required for the growth of single crystalline sapphire from a melt in a continuous process such as edge defined film fed growth (EFG). Very high purity material is required in order to grow high quality single crystalline sapphire. In order to maintain uniform growth conditions and maximize machine efficiency, the consumed source material in the melt must be replenished on a continuing basis during the growth of the sapphire.

There are several prior art systems designed specifically for delivering abrasive particles such as aluminum oxide. One of these systems comprises a disc having a major surface in a horizontal plane supported on a vertical shaft for rotating the disc within the horizontal plane. Material is deposited from an overhead hopper onto the upper surface of the rotating disc in order to cause the particles to traverse the disc surface in a controlled manner and fall off the edges of the disc into an exit chute. A system of this type is disclosed in U.S. Pat. No. 3,960,503.

Another one of these systems comprises a waterwheel-like thick circular disc having shallow cups or buckets in the periphery thereof for transporting small quantities of material as the disc is rotated about on a horizontal axis through the center of the vertically oriented disc.

A more accurate, more reliable, smoother metering system is needed in order to maintain the sapphire growth conditions substantially constant.

SUMMARY OF THE INVENTION

The present invention overcomes many of the problems of the prior art by employing as a dispenser a tubular member having an interior thread for transporting material from a source container to a discharge location. Rotation of the tubular member about its axis causes the interior thread to propel material from the source container toward the discharge location. This tubular member can include special threading and shaping of the discharge end of the tubular member to yield relatively evenly spaced frequent discharges of very small quantities of the material which approach a continuous trickle. This tubular member can also include on the exterior surface thereof a thread of opposite handedness to that of the interior thread to move material to-be-dispensed which is in the source container away from a container wall and toward the input end of the tubular member. By proper control of the level of the material within the tubular member extremely accurate material feed rates can be obtained for small quantities of material.

DETAILED DESCRIPTION OF THE PREFERRED EMBODIMENT

Figure 1:
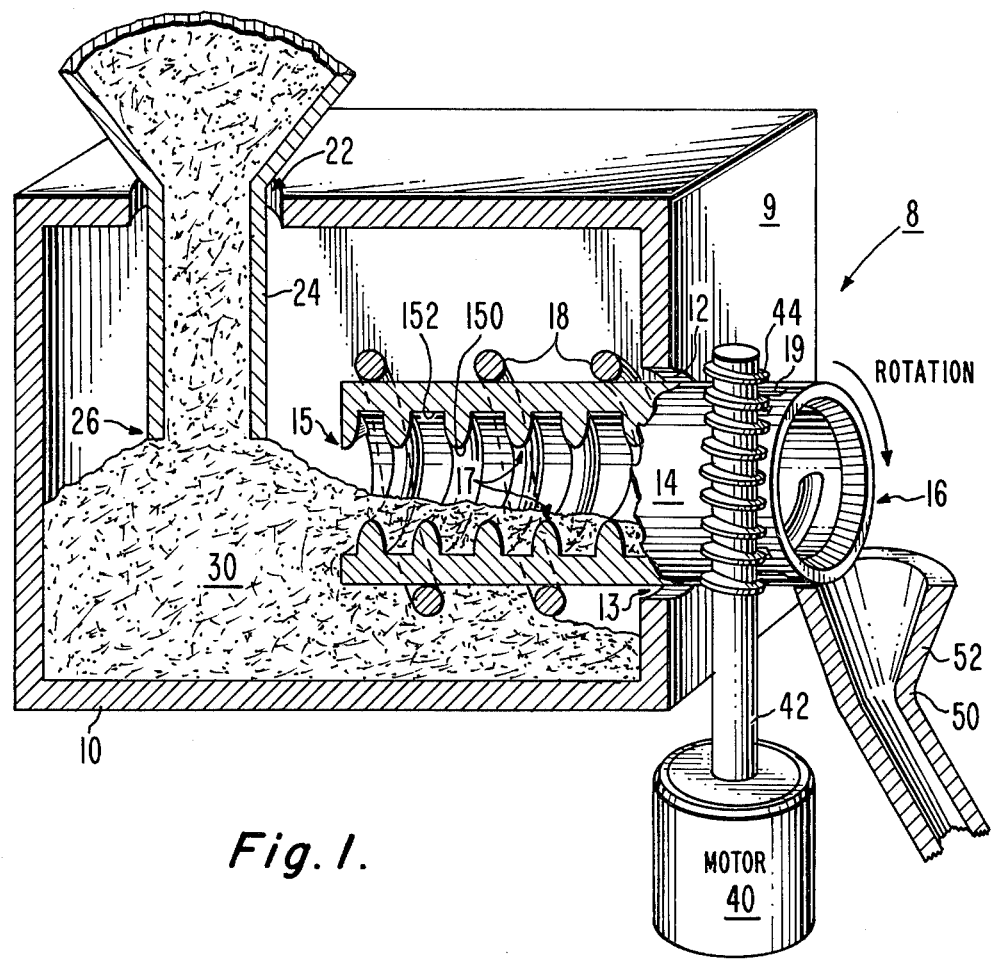
FIG. 1 illustrates a preferred embodiment of the invention in partial section.

A preferred embodiment of the inventive feeder intended to feed highly abrasive aluminum oxide ($Al_2O_3$) particles is illustrated generally at 8, in partial section, in FIG. 1. This feeder comprises a material source container 10 containing particulate material 30 to be fed and having an output port 12 in end wall 9 through which a tubular output transport member 14 passes and an input port 22 through which a funnel shaped input tube 24 passes. Tubular member 14 will often be referred to hereinafter merely as tube 14. Container 10 is illustrated as a closed box. However, container 10 may be open and need only have those walls needed to retain material 30 as desired.

Tube 14 has an input end 15 in source container 10, a discharge end 16 outside source chamber 10 and an interior thread 17 therebetween fixed to tube 14 for propelling the material 30 toward the output end 16 when tube 14 is rotated about its axis. An additional helical or thread member 18 having a handedness opposite to that of the interior thread 17 is located on the exterior surface of tube 14 within the source container 10. A gear 19 is formed in or mounted on the exterior surface of tube 14 outside the source container 10 so that a motor 40 having a worm gear 44 mounted on its shaft 42 may rotate tube 14 at an accurately controlled rate to dispense material 30 at a known rate. A motor whose rate of rotation can be varied over a wide range is preferred so that any desired discharge rate can be obtained. A d.c. motor is preferred. Tube 14 is supported by bearings which are not shown. Tubular member 14 will usually be right cylindrical in shape because such a shape simplifies the fabrication, mounting and rotation of tubular member 14. However, tubular members of other shapes may be utilized if desired.

Thread 17 is preferably machined or molded into the interior of tube 14, but may be separately formed of the same or different material and then inserted in tube 14. The interior surface of tube 14 and the surface of thread 17 are perferably formed of a material(s) which prevents the material 30 from sticking to them. The shape of thread 17 is a matter of design choice and may depend on the material to be fed and is preferably such that the material to be fed will not become mechanically stuck between the ridges of the thread. Where abrasive material is to be fed, the surfaces are preferably coated with abrasion resistant materials. For feeding extremely pure aluminum oxide material, it is preferred that all parts (especially tube 14) which contact the material-to-be-fed are either fabricated from high purity aluminum oxide or are coated with it to prevent erosion of the tube by the Al$_2$O$_3$ being fed and to prevent the introduction of contaminants into the material being fed. Tubular member 14 can also be made of aluminum which is then clear anodized to provide an aluminum oxide surface. The rolling and sliding motion minimizes or eliminates wear of this surface since the aluminum oxide which constitutes the anodized surface is quite hard.

The level of material 30 in chamber 10 is preferably kept low enough that in at least one portion of the length of tubular member 14, the material 30 to be discharged comprises a series of isolated packets which are separated from each other by intervening ridges of the thread 17 in a manner which prevents the material 30 from passing directly from one valley of the thread to the next adjacent valley of the thread by crossing over the intervening ridge. This provides positive control of the quantity of material being fed. In the areas where the packets of material are isolated in this manner, material 30 remains in contact with a given point of the inner surface of tube 14 only until the rotation of member 14 carries that point of the tube's surface far enough toward the top of the tube that the force of gravity causes the material 30 to roll (or possibly slide) down the side of the tubular member toward the bottom of the tube. The direction of rotation of tube 14 and the handedness of thread 17 are selected so that as the material 30 rolls or slides down the upward-moving surface of tube 14 thread 17 guides that material toward the discharge end of tube 14. A further benefit of operating the feed system with tube 14 substantially less than full is that it allows the particles of the material 30 to proceed through the tube in a rolling or sliding manner which minimizes or eliminates abrasion and scouring of the transport tube by the material being transported.

Figure 2:
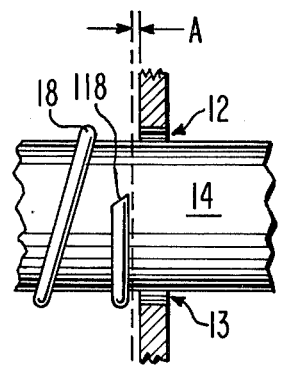
FIG. 2 illustrates a detail of the embodiment of FIG. 1.

At exit port 12 tube 14 passes through the end wall 9 of the source container with a small clearance and thus creates a potential interface 13 between stationary and moving parts. If particles to be fed were allowed to reach the potential interface 13 (hereinafter referred to as the output interface 13) the particles would accumulate and cause abrasion or jamming in the same manner as occurs with the prior art feed systems using a rotating auger inside a stationary tube. Consequently, some means must be provided to prevent the material-to-be-fed from reaching and jamming this output interface. In the embodiment of FIG. 1 this function is performed by an exterior thread 18 of the opposite handedness to that of interior thread 17. Exterior thread 18 may be machined into the transport tube 14, may be a separate threaded sleeve or may be a separate coil spring having significant separation between adjacent turns thereof, as illustrated in FIG. 1. A spring is preferred because (1) it has proved effective, (2) it minimizes material and machining costs and (3) it "sweeps" the area of the interface 13 since it extends radially beyond the initial outer periphery of tube 14. Coil spring 18 may be made of the same material as, or a different material than tube 14 and preferably has a relaxed inner diameter which is slightly smaller than the outer diameter of tube 14. To attach spring 18 to the tube 14, the spring is compressed to increase its inner diameter, is slipped onto tube 14 and is allowed to return towards its normal relaxed configuration. Spring 18 then elongates until the inner surface of the spring grips the outer surface of tube 14; a condition which prevents further elongation of spring 18 and establishes a good mechanical connection between tube 14 and spring 18. As is shown in FIG. 2 the chance of particles being forced up behind the end of the spring 18 into the interface 13 is minimized by provision of a bevel 118 on the end of spring 18 which is adjacent to the output interface 13, by providing a minimum of clearance "A" between the end of thread 18 and the wall of the chamber 10 and by providing about a half turn of pitchless spring material adjacent the wall of the chamber. Sufficient clearance must be provided to assure that the spring 18 will not scrape the wall and cause erosion of the spring or the wall and thereby introduce impurities into the materials within source container 10.

The configuration of spring 18 which has been found most effective for preventing particles of material 30 from reaching the exit port 12 is one wound from 3/16 inch diameter aluminum wire with a pitch of three threads per inch and with about ½ pitchless turn (perpendicular to the axis of tube 14) adjacent the wall of the container. This pitchless portion helps to avoid an excessive buildup of material against the container wall between successive passes of the leading edge of this thread. These wire and pitch dimensions are for a tube which has an outer diameter of approximately two inches. Other spring configurations may be used if desired.

When tube 14 is rotated to feed material forward to be dispensed, external thread 18 effectively pushes material away from output interface 13 back toward tube input end 15. Thus, this system induces adjacent material flows travelling in opposite directions without inducing intermixing of those flows.

The level of the material 30 within the source chamber 10 is controlled by the vertical placement within chamber 10 of the lower end 26 of the input tube 24. In this manner, the level to which the input end 15 of tube 14 fills with the particulate material to be fed is readily controlled.

Figure 3:
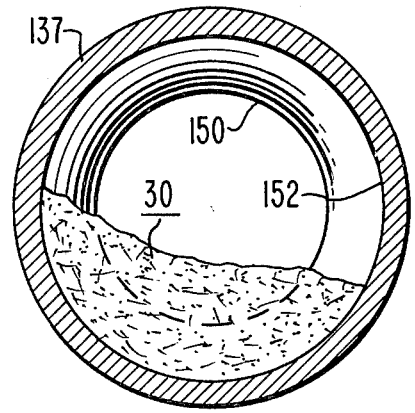
FIGS. 3, 4 and 5 illustrate material distribution within the transport tube in various locations along the length of the tube.
Figure 4:
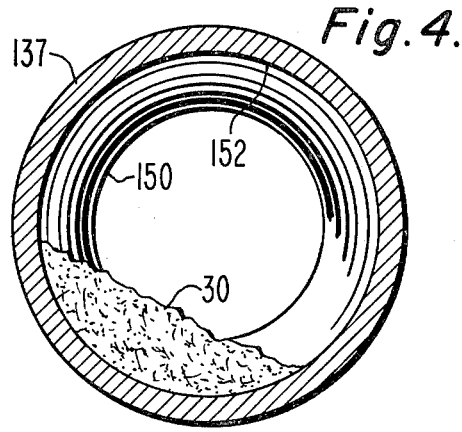
Figure 5:
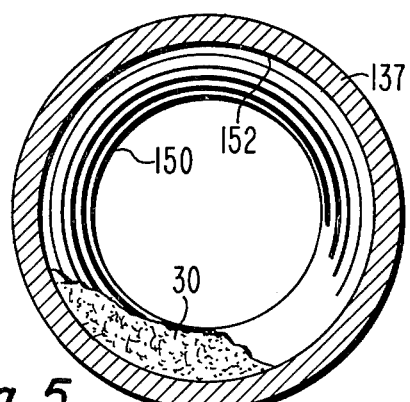

The level to which the input end 15 of tube 14 is filled with the material 30 to be fed can have an effect on the rate at which material is discharged from the output end 16 of tube 14. This is illustrated in FIGS. 3-5. In FIG. 3, the level of material at the input end 15 of the tube is illustrated. Here the material is substantially deeper within tube 14 than the height of the ridges 150 of the internal thread 17.

In FIG. 4, a cross-section taken nearer the output end 16 of the tube is illustrated. At this point, the material 30 to be fed still extends above the thread ridges 150, but by a substantially lesser amount than is the case at the input end illustrated in FIG. 3. If either the condition illustrated in FIG. 3 or 4 existed at the output end of the tube, the rate at which material would be discharged from the tube would not be accurately controlled.

FIG. 5 illustrates a cross section taken still nearer the output end of tube 14 at a location where the excess depth of the material at the input end of the tube no longer affects the quantity of material being transported along the tube. The distance from the input end of the tube at which this occurs depends on many characteristics of the feed system including the depth of the material 30 at the input end of the tube, the diameter of the tube, the height of the thread ridges 150 and possibly other characteristics. So long as the condition illustrated in FIG. 5 exists at some point along the length of tube 14, the rate at which material 30 is discharged from the tube may be accurately controlled.

In operation, as material is dispensed, more material enters the source container 10 via input tube 24. This keeps the level of material to be fed substantially constant within chamber 10, unless the vertical position of the bottom end 26 of tube 24 is changed or the main supply hopper feeding input tube 24 becomes empty.

EXAMPLE I

A tubular member 14 having an outer diameter of 2.250 inch, a length of 6.5 inches, an internal thread with a pitch of three turns per inch and ridges 0.250 inch high with a root diameter of 1.750 inch was used as tube 14. The material 30 consisted of $Al_2O_3$ particles which had passed through an 8 mesh screen and been retained by a 20 mesh screen. The height of the bottom 26 of input tube 24 was adjusted to a position which maintained the level of material 30 at the input end 15 of tube 14 $\frac{1}{4}$" to $\frac{1}{2}$" above the top of the portion of the first ridge 150 which was at the bottom of the tube. Under these conditions, the material feed rates for various tube rotation rates over a range from about $\frac{1}{2}$ rpm to about 10 rpm were substantially proportional to the rotation rate of the tube. Rotation rates less than $\frac{1}{2}$ rpm or greater than 10 rpm were not used but would be expected to retain the same substantial proportionality.

When in operation in the sapphire growth system, the entire feed mechanism, with the exception of motor 40 is installed within a vacuum chamber. Motor shaft 42 may pass through the wall of the vacuum chanber either mechanically or by magnetic coupling systems. The vacuum chamber is preferably initially evacuated in order to remove as many contaminants as possible via outgasing prior to the commencement of the sapphire growth process. During the growth process it is preferred to have the chamber filled with a pure inert gas or gasses in order that the sapphire growth need not take place under vacuum conditions and in order to protect against small leaks in the vacuum system. Some contaminants can be removed without using a vacuum by using a flowing inert gas to purge the system. However, this is less effective than vacuum outgasing. Although tube 14 may be driven in any appropriate manner, a worm gear drive is preferred over a belt drive because of the problem of the outgasing of contaminants from drive belts.

As particulate material 30 being fed reaches the discharge end 16 of transport tube 14, material 30 rolls or is pushed out of the end of the tube and falls under the influence of gravity into a funnel like upper end 52 of a tubular chute 50 which guides the material 30 into the melt crucible where the material is heated and liquified and becomes part of the melt and helps to maintain a constant volume of molten aluminum oxide to feed the sapphire crystal growth.

With a uniform internal thread 17 like that illustrated in FIG. 1 extending the full length of tube 14, the delivery of each packet of material from the beginning of the discharge of that packet to the completion of the discharge of that packet consumes only a portion of a revolution of the tube. The extent of this portion depends on the details of the thread configuration and the angle to which the material to be delivered will remain in contact with the side wall of the tube as that side wall approaches the vertical. Usually the portion of a revolution during which discharge takes place is between one quarter and one half revolution of the tube. During the remainder of each revolution of the tube no material is discharged. At the beginning of the next revolution the succeeding packet of material begins to be discharged. Thus, an intermittent feed is provided which comprises spaced in time discharges of substantial quantities of the material to be fed.

In the growth of sapphire in flat ribbon or other forms by the EFG process, the infrequent addition of large quantities of aluminum oxide to the melt to replace the aluminum oxide which has been consumed by the crystal growth can cause striations in the grown ribbon because of a resultant cycling of the temperature at the growth surface of the crystal. For this reason, more frequent, smaller additions of aluminum oxide are preferred. A first way this can be achieved is by designing the tube and thread so that each individual packet is very small and then rotating the tube at a high rate of speed to discharge many packets per minute. This technique is not preferred because it restricts the ability to deliver material at a substantially higher rate if desired. A second way is to use an internal thread 17 having thin blade-like ridges in order to maximize the portion of the revolution of the tube during which material is discharged.

Figure 6:
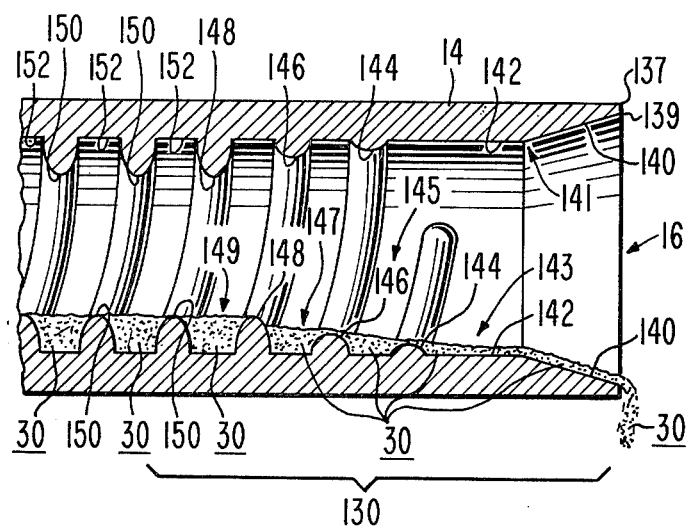
FIG. 6 illustrates details of the output end of the preferred feed tube.
Figure 7:
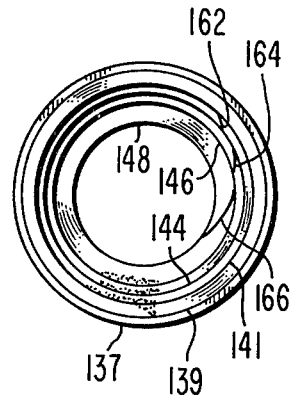
FIG. 7 is an end-on view of the output end illustrated in FIG. 6.

A third, and preferred, manner of providing an essentially continuous discharge is to modify the inside of tube 14 in the vicinity of the discharge end 16 to provide a flow-smoothing output end 130. As illustrated in FIG. 6, flow-smoothing output end 130 has a chamfer 140 on the interior surface adjacent end 16. When tube 14 is rotating, the chamfer 140 causes any material thereon to move slowly, but irreversibly toward the exit end 16. Proceeding from chamfer 140 toward the input end of tube 14, there is a threadless cylindrical portion 142 which extends from the input end of the chamfer to the end of the internal thread 17 and has an inner diameter equal to the root diameter of thread 17. The boundary between the chamfer 140 and the cylindrical portion 142 has been identified by the reference numeral 141 in FIG. 6. The last turn of the internal thread 17 is cut down so that the ridge 144 forming that turn is only one quarter the height of the ridges 150 in the uniform portion of the internal thread 17. The second to last turn 146 of the internal thread is cut down so that the ridge 146 thereof is only half as tall as the ridges 150. The third to last turn of the internal thread has a ridge 148 which extends to the full height of the ridges 150 in the uniform portion of the thread and is the last full height turn of the thread. An end-on view of this output end is illustrated in FIG. 7, where the transitions 162 from ridge 144 to region 142, 164 from ridge 146 to ridge 144 and 166 from ridge 148 to ridge 146 are each shown as gradual. These transitions may be abrupt if desired.

For clarity in the following discussion, the packet of material which is located between the thread ridge 144 and the discharge end 16 of tube 14 will be referred to as packet 143; the packet of material between ridges 144 and 146 will be referred to as packet 145; the packet between ridges 146 and 148 will be referred to as packet 147 and the packet between ridge 148 and the ridge 150 adjacent thereto will be referred to as packet 149. In operation, the full height ridges 148 and 150 retain packet 149 in an isolated condition without intermixing with adjacent packets. Because of the reduced height of ridge 146, portions of the packet 147 which would otherwise be confined between ridges 146 and 148 spill over ridge 146 into the region between the ridges 146 and 144 which would be occupied solely by packet 145 if the ridge 146 were of full height. In a similar manner, portions of packet 145 spill over the lower ridge 144 into the region which would be occupied solely by the packet 143 if the ridges 144 and 146 werre full height. Portions of the packet 147 may also be in this region. In this manner, the packets of material intermix and there tends to be a substantially continuous (with respect to both time and area) layer of material 30 comprising packet 143 in the smooth or cyclindrical portion 142 of tubular member 14. As additional material passes over the ridge 144, the material on region 143 is pushed toward the exit end 16 of the tube. Once this material reaches the boundary 141 between the cylindrical portion 142 and the chamfer 140, the material is propelled toward the exit end of the tube by a combination of pushing from behind by additional material and by rolling or sliding down the slope of the chamfer as the tube rotates. This results in frequent discharges of small quantities of the material which can amount to an almost continuous trickle of the material.

EXAMPLE II

The tube described in Example I was modified to have a flow smoothing end 130. The chamfer 140 had a maximum diameter (at point 139) of 2.125 inches and extended ⅜ inch toward the input end of the tube, i.e. transition 141 was ⅜ inch from the end of the tube. Smooth or cylindrical section 142 extended from ⅜ to ¾ inch from the end of the tube. Ridge 144 was 1/16 inch high, ridge 146 was ⅛ inch high and ridge 148 retained its original ¼ inch height. This flow smoothing end produced 30 to 40 small discharges per revolution of the tube. For some representative rotation rates this tube produced the feed rates indicated in the following table when feeding the material used in Example I:

| Rotation Rate rpm | Feed Rate Grows/Minute |
| --- | --- |
| ½ | 1.04 |
| 1 | 2.11 |
| 2 | 4.33 |
| 4 | 9.10 |

Once again substantial feedrate proportionality to rotation rate was retained to the highest rate tested (10 rpm) and would be expected to continue if the rotation rate were further increased.

Many other means of smoothing the output may be utilized, including, inter alia, just the chamfer 140, just the cylindrical section 142 or just the thread ridges of reduced height, or combinations of these.

Transport member 14 imparts linear motion to the material to be fed in the sense that it transports it from the input end 15 of transport member 14 to the discharge end 16. However, an individual particle being transported is regularly carried perpendicular to that direction as the tubular member 14 rotates until that particle begins to slide or roll back toward the bottom of the tube because of a lack of adherence to the increasingly vertical tube surface to which it is adjacent. During the rolling back, the particle moves toward discharge end 16 of tube 14 because the pitch of the thread 17 induces such motion. Consequently, an individual particle in passing from the input end 15 to the output end 16 of transport tube 14 does not undergo strictly rectilinear motion, but rather follows a more or less sawtooth path. This motion will be referred to as quasi-rectilinear motion since the ultimate affect is rectilinear displacement by the length of the transport tube 14 and because the oscillatory motion within tube 14 is inconsequential for most materials and in particular for aluminum oxide particles. Quasi-rectilinear motion will also encompass strictly rectilinear motion.

Figure 8:
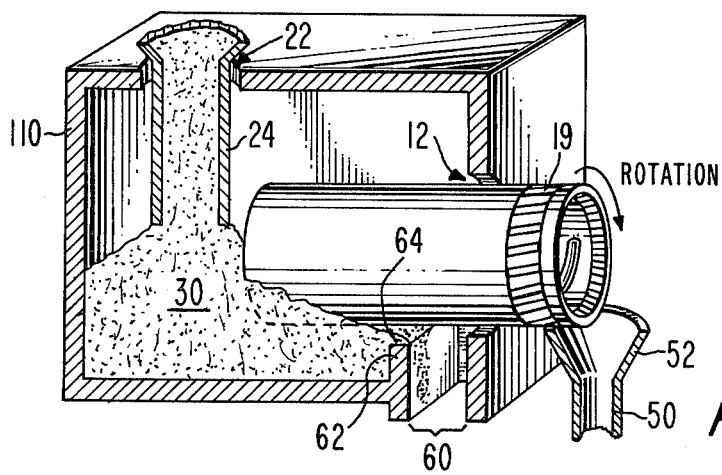
FIG. 8 is an illustration of an alternative embodiment of the invention.

FIG. 8 illustrates an alternate means of preventing the accumulation of the material to be fed 30 at the interface 13 between the transport tube 14 and the output port 12 of a modified source container 110. Those parts of chamber 110 which are similar to corresponding parts of chamber 10 in FIG. 1 have been given the same reference numerals in FIG. 8 as in FIG. 1. The drive mechanism would be the same as for the system illustrated in FIG. 1 but has been omitted for simplicity. The major difference between the system of FIG. 1 and the system of FIG. 8 is in the means for preventing the accumulation of particles at the output interface 13. In the embodiment of FIG. 8, this is accomplished by providing an overflow port 60 in the bottom of the source chamber 10 adjacent the end wall 9 containing output port 12 and extending a sufficient distance to either side of the center of the output port 12 to assure that any material 30 to be fed which might otherwise reach the output interface 13 will instead fall through the overflow port 60. Clearly, the spacing of all the fixed surfaces within source chamber 10 which are contacted by the material to be fed (including the top 64 of the front wall 62 of the overflow port 60) must be spaced far enough from tube 14 that no binding or scouring action can occur between the material to be fed and any of the fixed surfaces and the rotating tube 14. This spacing distance must be greater than the maximum dimension of the material and is preferably many times that distance.

As a further alternative, output port 12 in the embodiment of FIG. 1 may be made substantially larger than tube 14 so that instead of particles accumulating at interface 13, particles reaching interface 13 would pass through output port 12 as though it were an overflow port. These techniques are not preferred because each of them reduces the total quantity of material 30 which may be accurately metered into the gravity guide chute 50 from a given initial charge to an amount which is less than it is for the embodiment of FIG. 1. However, some materials may not be totally excluded from the vicinity of the output port 12 by the exterior thread 18 of the embodiment of FIG. 1. Consequently, for those materials, a combination of thread 18 and an overflow port may be desirable.

When fabricated and coated as described, the feeder of the examples was highly successful in accurately feeding the specified $Al_2O_3$ particles without introducing impurities which would adversely affect the EFG growth of sapphire ribbons 3 inches wide.

A feed system for accurately metering and dispensing small quantities of abrasive particles has been illustrated and described. Those skilled in the art will be able to make numerous changes in this system without departing from the scope of the invention which is limited only by the appended claims.

What is claimed is:

1. A material metering and dispensing system for accurately metering and dispensing particles and powders, said system comprising:
   container means for storing the material to be metered and dispensed;
   a tubular material transport member having a length, an interior surface, an exterior surface, an input end within the boundaries of said container means and an output end outside said container means;
   thread means along the interior surface of said tubular member and fixed thereto for causing material within said member to transfer from said input end to said output end in a quasi-rectilinear manner in response to rotation of said tubular member about an axis substantially parallel to the length of said tubular member;
   discharge flow smoothing means comprising:
     a chamfer on the interior surface of said tubular means at the output end thereof;
     a threadless portion of said interior surface of said tubular means adjacent said chamfer, said threadless region having an interior diameter which is substantially the same as the root diameter of the threads of said thread means; and
     portions of said thread means in the vicinity of said threadless section having ridges of reduced height as compared to the remainder of said thread means;
   and
   means for preventing localized portions of the material to be fed from simultaneously contacting said exterior surface of said tubular member and a wall of said container means.

2. The metering and dispensing system recited in claim 1 wherein said means for preventing comprises helical means having a handedness which is opposite to that of said thread means for moving material away from said wall of said container and toward said input end of said tubular means in response to the same rotation of the tubular means which causes said thread means to move material from said input end of said tubular means to the output end of said tubular means, said helical means disposed adjacent to and encircling said exterior surface of said tubular means and being located within said container.

3. The metering and dispensing system recited in claim 2 wherein said tubular member and said helical means are fabricated separately and then assembled.

4. The metering and dispensing system recited in claim 3 wherein said tubular member and said helical means are made of different materials.

5. The metering and dispensing system recited in claim 1 wherein means for preventing comprises helical means having a handedness which is opposite to that of said thread means to enable said tubular transport member to transport the material to be fed in opposite directions simultaneously, both toward and away from the same point, without intermixing the two flows so induced.

6. The metering and dispensing system recited in claim 1 further comprising a protective coating on all portions of the system which come in contact with the material to be dispensed.

7. A material metering and dispensing system for accurately metering and dispensing particles and powders, said system comprising:
   container means for storing the material to be metered and dispensed;
   a tubular material transport member having a length, an interior surface, an input end positioned to receive material stored by said container means and an output end;
   thread means along the interior surface of said tubular member and fixed thereto for causing material within said member to transfer from said input end to said output end in a quasi-rectilinear manner in response to rotation of said tubular member about an axis substantially parallel to the length of said tubular member; and
   discharge flow smoothing means for causing said tubular transport member to dispense said material in relatively small, relatively evenly spaced in time, quantities in response to rotation of said tubular member at a constant speed, said discharge flow smoothing means comprising:
     a chamfer on the interior surface of said tubular member at the output end thereof,
     a threadless portion of said interior surface of said tubular member adjacent said chamfer, said threadless region having an interior diameter which is substantially the same as the root diameter of the threads of said thread means; and
     portions of said thread means in the vicinity of said threadless section having ridges of reduced height as compared to the remainder of said thread means.

8. The metering and dispensing system recited in claim 7 further comprising a protective coating on all portions of the system which come in contact with the material to be dispensed.

* * * * *